United States Patent [19]

Hillery

[11] 4,195,361
[45] Mar. 25, 1980

[54] VARIABLE FREQUENCY ACOUSTIC FILTER

[75] Inventor: Herbert V. Hillery, Austin, Tex.

[73] Assignee: The United States of America as represented by the Secretary of the Navy, Washington, D.C.

[21] Appl. No.: 581,261

[22] Filed: Apr. 27, 1956

[51] Int. Cl.² .................................................. H04R 23/00
[52] U.S. Cl. .................................. 367/149; 367/171; 310/300
[58] Field of Search .................. 340/1, 8, 16, 13, 13 E, 340/16 R, 8 R; 181/33, 0.5; 310/2, 300; 250/23

[56] References Cited

U.S. PATENT DOCUMENTS

| 1,027,238 | 5/1912 | Carlson | 250/23 |
| 2,615,940 | 10/1952 | Williams | 340/13 |
| 2,685,025 | 7/1954 | Root | 340/13 |
| 2,824,292 | 2/1958 | Christoph | 340/13 E |
| 3,812,456 | 5/1974 | Lane et al. | 340/13 E |

*Primary Examiner*—Nelson Moskowitz
*Attorney, Agent, or Firm*—R. S. Sciascia; A. L. Branning

EXEMPLARY CLAIM

1. In a hydroacoustic filter and electrolytic detector system of the character described, means for providing a housing for a unitary assembly of an electrolytic detector and a hydro-acoustic filter circuit of selectable frequency attenuation characteristic to provide a plurality of band pass ranges for said system, which comprises an electrolytic detector cell, a first acoustic capacitance means connected in series with a first side of the input of said circuit, a second series connected acoustic capacitance connected in a second signal input side of said circuit, switching means providing a first plurality of hydraulic inductance-resistance tubes, with a preselected one of said plurality of tubes being normally disposed in a position to provide a shunting of the remainder of the hydroacoustic filter and electrolytic detector system, said switching means further including means providing a second plurality of hydraulic inductance-resistance tube members disposed for selective connection of a predetermined one thereof in series with said first named input capacitance and contemporaneously with a predetermining one of said first tubes, means for selecting one each of said plurality of series and shunt tubes to provide in conjunction with the other filter elements preselected signal attenuation in a desired frequency range, means providing a third acoustic capacitance in series with said series inductance-resistance tube, a fourth capacitance means providing a shunting of the signal output of said third capacitance around said detector cell, means providing a fluid connection of said detector cell, and means for deriving an output of predetermined frequency characteristics from said detector.

6 Claims, 5 Drawing Figures

VARIABLE FREQUENCY ACOUSTIC FILTER

This invention relates to an hydroacoustic filter device for use with underwater acoustic detecting mechanisms of a character adapted for inclusion in naval mine mechanisms. More particularly the instant hydro-acoustic filter is of a character adapted to provide selection of a plurality of different band pass frequencies to render the mechanism effective in response to signals from targets of predetermined selectable acoustic frequency bands indicative of certain types of target vessels. The instant filter system is of a character well adapted for usage with an electrolytic detector and this type of detector may be incorporated in a common housing with the filter mechanism herein to be described. A detector cell is a device which utilizes the phenomenon known as "concentration polarization" to detect and/or indicate flow in a solution containing oxidizable and reducible ions. Examples of suitable redox systems are: ferricyanide-ferrocyanide, ceric-cerous, ferric-ferrous, or iodine-iodide. If an iodine-iodide solution is employed, the cathodic reduction of iodine is made the controlling reaction by using a low concentration of iodine [about $10^{-2}N$] and a relatively high iodide concentration [about 0.5 N]. When the solution is quiescent, the current is controlled by diffusion. If, however, fluid flow of the electrolyte increases, the number of iodine ions available at the cathode increases thereby increasing the current in the system. This fluid flow is usually induced by flexure of a diaphragm in contact with the solution which flexure may be initiated by heat, mechanical pressure or acoustical pressure. The increase of current in the system can therefore be equated to the heat or pressure which caused flexure of the diaphragm.

While the instant invention will be described with reference to an electrolytic detector it is to be understood that other acoustic detecting devices may be used with the device without departing from the scope of the instant invention. However for reasons which will become apparent as the description proceeds it is preferable to utilize an electrolytic detecting device with the instant invention because of the low power requirements of a device of this character.

Prior art filter systems have incorporated electrical filters providing certain bandpass characteristics for use with electronic amplifying tubes in the detecting amplifying system therefor. As is well known to those skilled in the art, the power level requirements of electronic tube circuits are such as to present a greater current drain on the batteries if the device is used in a mine or the like and therefore materially shorten the overall life of the mine as well as presenting certain problems in stockpiling thereof.

The instant filtering mechanism by which selectable band pass characteristics may be obtained includes capacitive, resistive and inductive elements of a hydraulic character but which are analogous to corresponding electrical filter components.

It is a feature of the invention to provide a system in which only the inductive and resistive components are interchanged and in which the capacitative elements remain constant for all the band pass filter characteristics to which the device is intended to be subjected.

It is one object of the invention to provide a hydroacoustic filter mechanism in which the band pass characteristics of the filter may be changed at will for a plurality of selected frequency bands by the changing of only the resistive and inductive components thereof.

Another object of the invention is to provide a selectable frequency band pass filter of a character adapted for use at low frequencies for acoustic detection of signal intelligence of a character indicative of the passage of a vessel in the vicinity of the mine in which the instant filter is incorporated and which provides for selection of said band pass characteristics either prior to assembly or after installation in the mine unit.

Other objects and many of the attendant advantages of this invention will be readily appreciated as the same becomes better understood by reference to the following detailed description when considered in connection with the accompanying drawings wherein.

Figure 1:
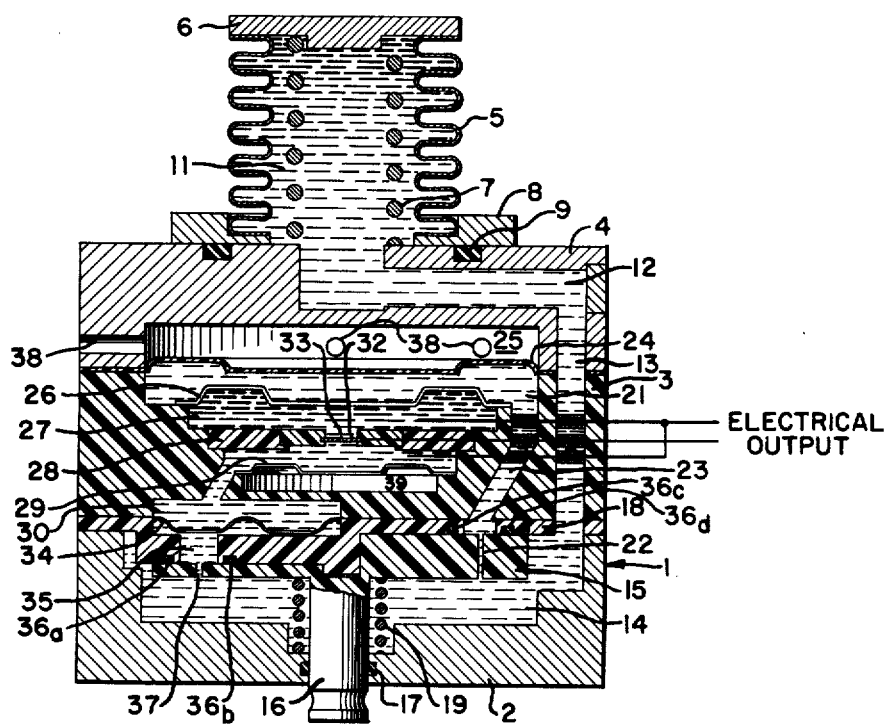
FIG. 1 is an axial view in vertical section of a diagrammatic example of a switching filter of the instant invention.

Referring now to the drawings and more particularly to the acoustic circuit of FIG. 1 there is shown a hydroacoustic filter of a selectable resistance-inductance switching character which is indicated generally at 1. This assembly comprises a lower housing portion 2 of brass or the like, an intermediate detector housing portion of plastic material at 3 and an upper metallic casing portion at 4. Disposed in a manner to be exposed to the sound carrying medium is an expansible bellows 5 disposed generally between the upper casing 4 and a disc shaped mass 6 by which the acoustic signal intelligence of random frequencies is applied to the filter. The diaphragm and bellows assembly comprising elements 5 and 6 is spring loaded by a compression spring 7 which is disposed between the disc shaped mass 6 and the housing 4. The bellows 5 is sealed to disc 6 at the upper end thereof and to a suitable annular seat member 8. This seat member 8 receives the bellows 5 at a recessed portion thereof and engages the "O-ring" gasket 9 at the lower face thereof to effect a water tight seal with the upper face of the casing portion 4. This element 8 is clamped or attached to the casing 4 in any suitable manner not shown.

The interior of the filter assembly is liquid filled and comprises the input chamber 11 which connects by a transfer passage 12 and a bent tube passage 13 to a second chamber 14 in the lower housing portion 2.

Disposed within the lower casing member 2 is a switching plate 15 for changing the hydraulic resistance-inductance to provide the desired attenuation range of the filter, the function of which will become apparent as the description proceeds. The switching plate 15 terminates in a shaft 16 which is integral therewith and extends through the lower portion of the lower housing 2 in a manner permitting limited rotation thereof externally of the filter. A seal between the shaft and casing is provided by a suitable "O-ring" gasket 17. This switching plate abuts with the fixed switch disc element 18. As shown in FIG. 1 this intermediate element 18 is provided with a plurality of fluid communication passages therethrough, one of which connects with the chamber 21 to provide fluid communication with the chamber 14 through one of the selected orifices or short tubes 22 in the switching plate.

The chamber 21 is enclosed by the Sirvene type bellows diaphragm 24 disposed between the housing elements 3 and 4 and further provides an air chamber 25 having vents at 38 to the exterior of the filter.

Diaphragm 24 provides volume-takeup of the fluid displaced when bellows 5 is compressed by increasing static pressure on its external surface due to submersion in the sound carrying medium. An electrolytic detector cell is disposed in the upper portion of the plastic body 3 and is provided with an upper electrolyte chamber 27, hereinafter referred to as the output chamber and an input chamber 30. Both chambers are filled with one of the redox solutions mentioned hereinbefore. The separation between the input and output chambers is provided by an inert separating portion 28 which is constructed of polytrifluorochloroethylene carries the cathode button generally designated at 32. This cathode button is provided with a cathode orifice at 33 for providing fluid communication between the input chamber 30 and the output chamber 27. When the redox solution is disturbed by movement of diaphragms 26 and 34 in response to an acoustic signal of the proper frequency band being received at chamber 11, the solution flows through the cathode orifice 33 thereby varying the electrical potential between the electrical lead connected to the cathode 32 and the leads immersed in the redox solution in chambers 27 and 30. This gives rise to an electrical output when the frequency band of the acoustic signal falls within a range determined by the preselected values of acoustic impedance of tubes 22 and 37 at various frequencies. Additionally, there is an internal diaphragm 29 in the detector cell which is air backed by chamber 39. The detector is enclosed by bellows diaphragm 34 on the input side of the electrolyte chamber 30. This diaphragm 34 is in fluid communication with the chamber 14 by means of the preselected orifice tube 37 of the switching plate 15 and fluid flow through the tube 37 enters the passage chamber 35 at the outer side of the detector diaphragm 34. The seal between the switching plate and the intermediate disc or switch plate assembly 15 is provided by a plurality of O-ring gaskets or the like indicated generally at 36a, 36b, 36c and 36d. If a single frequency band filter is desired without the possibility of switching, then construction may be such that the intermediate plate 18 and the switching plate 15 are integral, in which case any necessity for the gaskets 36a, 36b, 36c and 36d is obviated.

Figure 2:
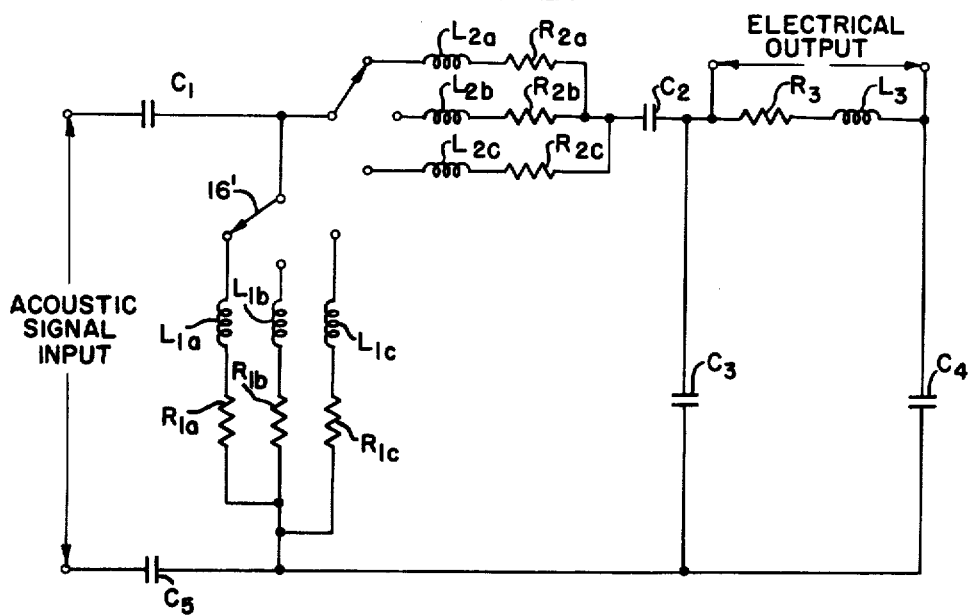
FIG. 2 is a circuit schematic of an electrical analogue of the filter of FIG. 1.

Referring now to FIG. 2 the electrical analogue circuit of the filter of FIG. 1, it will become more apparent wherein the switching arrangement utilizing only the switching of the short hydraulic tubes indicated generally at 22 and 37 provides for a selection of a plurality of frequency ranges for operation of the filter and detecting device.

The capacitance element $C_1$, FIG. 2, corresponds to the capacitance provided by the expansible bellows 5 and enclosed compression spring 7. The bellows encloses a quantity of Dow-Corning silicon fluid or other fluid of suitable density and viscosity.

The signal to be filtered is impressed at the input plate 6 and subjected to coupling through the capacitance $C_1$ of bellows 5 and spring 7 to apply the signal through the shunt resistances and inductances of one of the switching plate tubes 22, the hydraulic resistance and inductance of which is generally indicated at $L_{1a}$-$R_{1a}$, $L_{1b}$-$R_{1b}$ and $L_{1c}$-$R_{1c}$ respectively as determined by the position of the shaft 16 which corresponds to the movable switch selector arm indicated by the arrow 16' of FIG. 2. This signal is then impressed across the tube 22 between chamber 14 and chamber 21. Chamber 21 is provided with the air backed bellows 24 which corresponds to the capacitance $C_5$. The diaphragm 26 corresponds to the capacitance $C_4$ and is the output diaphragm of the detector. The series arm of the filter is provided by selecting a predetermined hydraulic tube 37 which is in communication with the chambers 35 and 14 and corresponds to the electrical inductance-resistance as shown in FIG. 2 at $L_{2a}$-$R_{2a}$, $L_{2b}$-$R_{2b}$, $L_{2c}$-$R_{2c}$. The capacitance $C_2$ of FIG. 2 corresponds to the input diaphragm of the detector cell indicated at 34. The shunt capacitance $C_3$ is provided by the air backed chamber 39 and its enclosing diaphragm 29 in adjacency to the detector cell. The resistance and inductance elements indicated at $R_3$ and $L_3$ are the resistance and inductance of the detector cell cathode orifice 33 across which the electrical output is derived. The acoustic signal impressed across tube 22 is equally impressed across the series combination of tube 37, diaphragm 34, orifice 33, and diaphragm 26, the last two mentioned elements being shunted by diaphragm 29 and its adjacent air volume. Because of the relative acoustic impedances of these various elements, for signals of a predetermined band of frequencies, most of the impressed signal appears across orifice 33. From the foregoing it is deemed apparent that a filter circuit is provided by which a plurality of selected frequency characteristics may be selected merely by changing the resistance and inductance presented by the selected short tubes in the switching plate 15 of the mechanical embodiment of the filter. The utilization of a non-symmetrical filter configuration and the proper selection of the circuit parameters provides for a compact mechanical embodiment of the filter. The circuit characteristics may be selectably switched by suitable connection of a knob or other suitable means to the shaft extension 16 which extends through the casing 2. The seal between the switching plate and the intermediate plate 18 is further facilitated by the compression spring 19.

Figure 3:
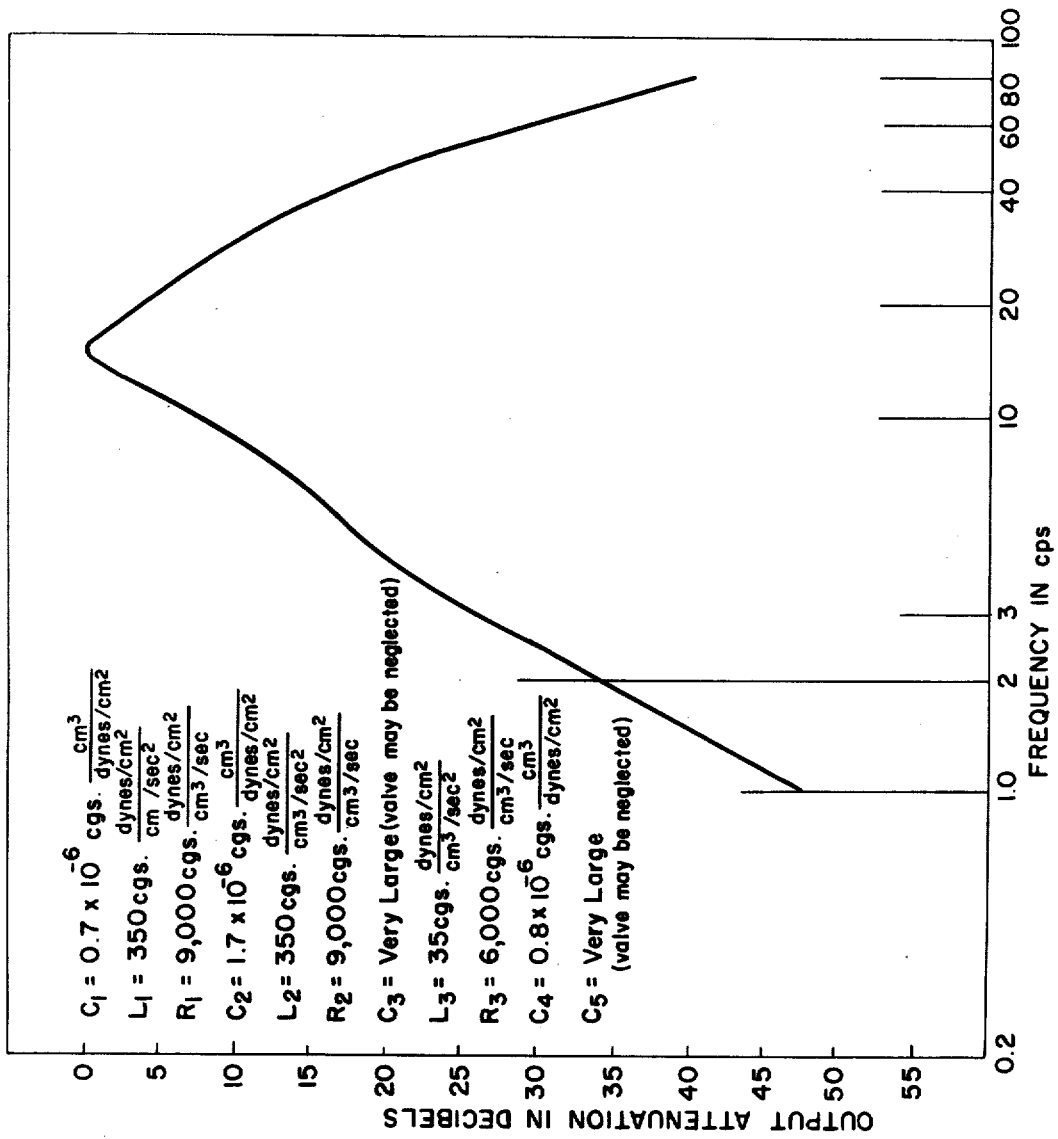
FIGS. 3 to 5 are curves showing the band pass frequency characteristics of three electrical analogue responses for hydroacoustically switchable filter network parameters.
Figure 4:
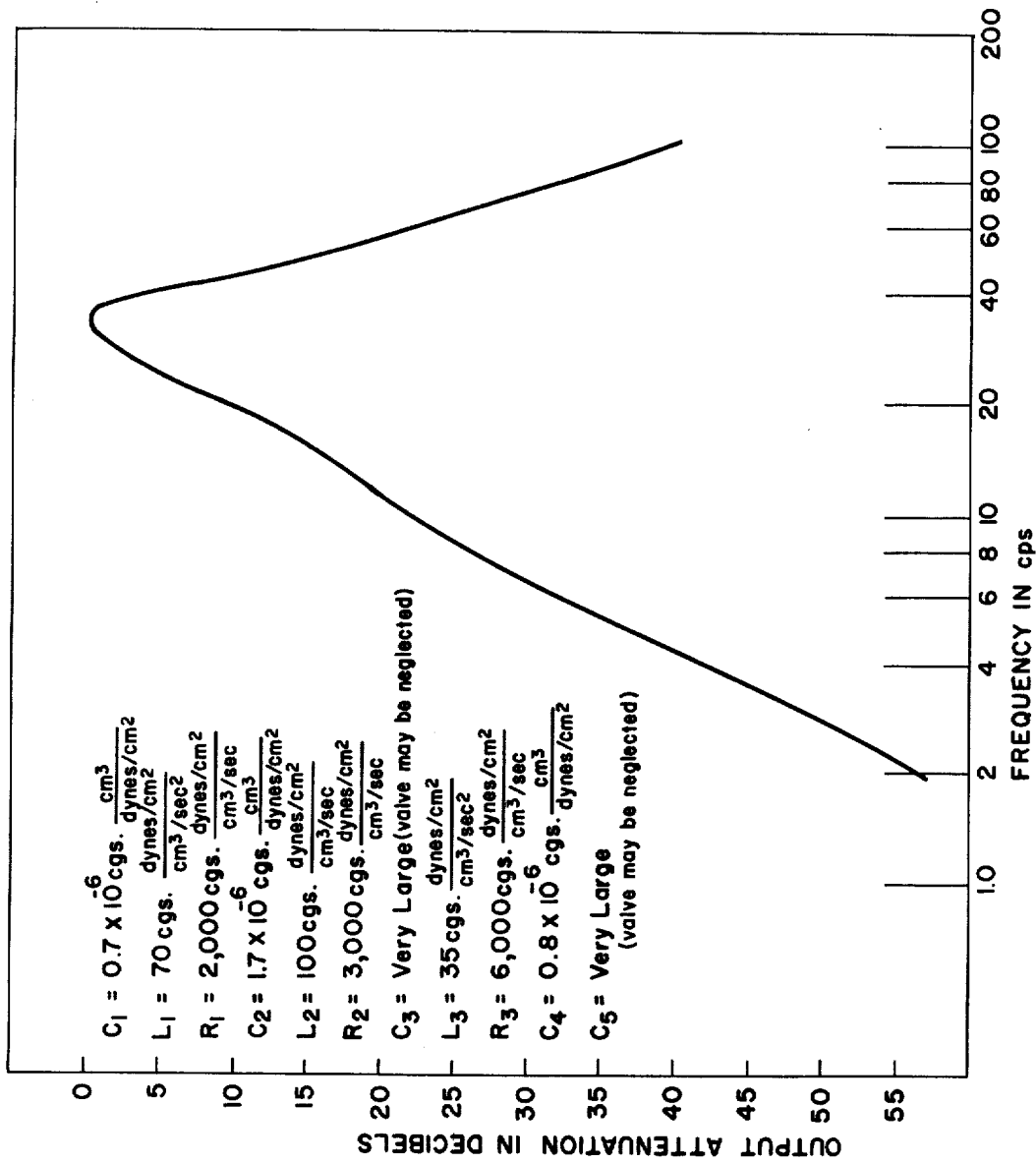
Figure 5:
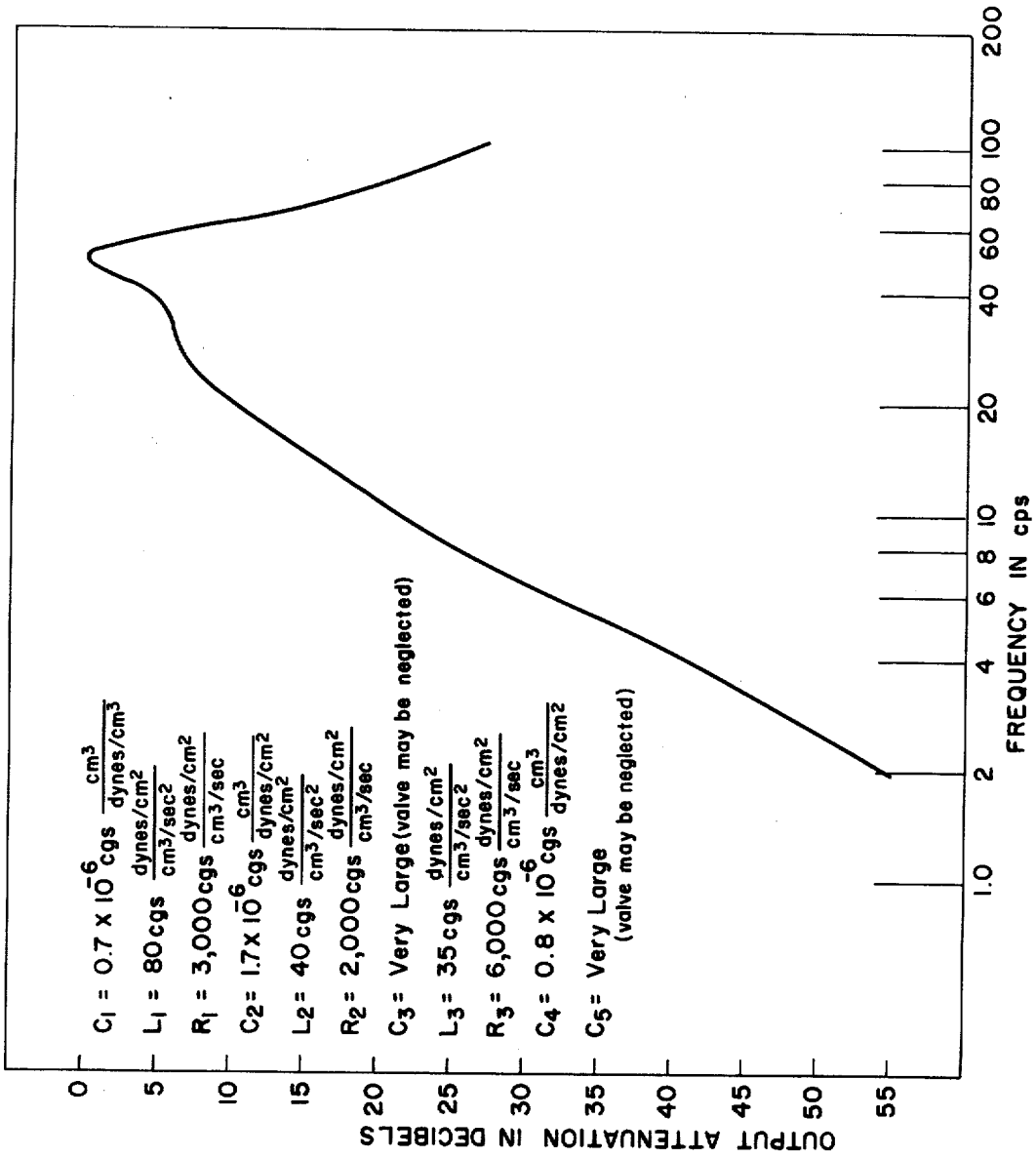

Referring now to FIGS. 3, 4 and 5 there are shown curves of the frequency response characteristics for three frequency ranges of switchable filters of the instant invention. The frequency response of the filter of FIG. 3 is such as to pass a band in the range of 10 to 20 cycles per second and the curve is a showing of the output attenuation characteristics in decibels with changes in frequency in cycles per second. The design values for the components are as shown in the tabulation on the Fig., as indicated on the Fig. all dimensions are in the centimeter, gram second system [cgs]. In the analogous electrical system, C is, of course, defined by the equation $C = (q/v)$ i.e. capacitance = (quantity of change/voltage). Accordingly, hydraulic or acoustic compliance is defined by the analogous quantities $C = $ (volume of fluid/pressure) = $(cm^3/dynes/cm^2)$ in the cgs system. Similarly, hydraulic or acoustic resistance = $(dynes/cm^2/cm^3/sec)$; and hydraulic or acoustic inertance = $(dynes/cm^2/cm^3/sec^2)$. Where a compliance is indicated to be "very large" as for example $C_3$ and $C_5$, its value is so great that it may be neglected in computing the various circuit parameters. The filter of FIG. 4 is for a pass band of 20 to 40 cycles per second while the curve of FIG. 5 is for a filter for the operation over a broader pass band of 15 to 60 cycles per second. Similar to the case of FIG. 3, the values of the circuit parameters are shown in the tabulations accompanying the figures.

Obviously many modifications and variations of the present invention are possible in the light of the above teachings. It is therefore to be understood that within the scope of the appended claims the invention may be practice otherwise than as specifically described.

What is claimed as new and desired to be secured by Letters Patent of the United States is:

1. In a hydroacoustic filter and electrolytic detector system of the character described, means for providing a housing for a unitary assembly of an electrolytic detector and a hydroacoustic filter circuit of selectable frequency attenuation characteristic to provide a plurality of band pass ranges for said system, which comprises an electrolytic detector cell, a first acoustic capacitance means connected in series with a first side of the input of said circuit, a second series connected acoustic capacitance connected in a second signal input side of said circuit, switching means providing a first plurality of hydraulic inductance-resistance tubes, with a preselected one of said plurality of tubes being normally disposed in a position to provide a shunting of the remainder of the hydroacoustic filter and electrolytic detector system, said switching means further including means providing a second plurality of hydraulic inductance-resistance tube members disposed for selective connection of a predetermined one thereof in series with said first named input capacitance and contemparaneously with a predetermining one of said first tubes, means for selecting one each of said plurality of series and shunt tubes to provide in conjunction with the other filter elements preselected signal attenuation in a desired frequency range, means providing a third acoustic capacitance in series with said series inductance-resistance tube, a fourth capacitance means providing a shunting of the signal output of said third capacitance around said detector cell, means providing a fluid connection of said detector cell, and means for deriving an output of predetermined frequency characteristics from said detector.

2. The structure of claim 1 further characterized by the inclusion of a rotatable means including a shaft extending externally of said filter casing for selectably positioning said shunting tubes and said series side inductance-resistance tube members for hydroacoustic signal coupling through said switching means.

3. A hydroacoustic electrolytic detector and acoustic filter circuit device of the character described comprising, casing means having chambers therein for containing a hydraulic fluid, a plurality of flow passages in said casing, means providing a switching plate having a first plurality of hydraulic inductance-resistance tubes disposed therein in an arrangement for providing switching in a series leg of said filter circuit provided by the device, a second plurality of said hydraulic inductance-resistance tubes disposed for presenting a preselected tube passage thereof into a shunting relationship in said filter circuit with actuation of said switching plate, and means on said switching plate extending exteriorly of the casing for providing external selection of a predetermined desired pass band characteristic for said filter.

4. The device of claim 3 further including means providing a plurality of hydraulic-acoustic capacitances in said casing, one of said capacitances being constructed to provide an enclosed variable air volume, a second capacitance comprising an expansible type input bellows with attached spring which is adapted to be disposed in contact with a sound carrying medium and having means thereon for presenting an acoustic signal as transmitted through the surrounding sound carrying medium to the input of said filter circuit, the other capacitances comprising bellows diaphragms of suitable stiffness, said plurality of passages providing fluid communication between said input bellows and said electrolytic detector, by way of said series resistance-inductance tube of said switching plate, said detector comprising a pair of flexible diaphragms for enclosing a volume of electrolyte fluid therein, a cathode means having an orifice therein disposed in said detector for providing a flow of electrolyte therethrough in response to application of an acoustic signal to the input diaphragm thereof, anode means in said cell connected in a circuit including said potential means and for providing an electrical signal output with ionic flow of said electrolyte fluid to said cathode orifice, and the capacitance element including an enclosed air volume disposed within the detector cell in a manner to provide a shunt circuit with the cathode orifice, the output diaphragm of said electrolytic detector being disposed in fluid communication with the preselected orifice of said switching plate in the shunt resistance-inductance leg of said filter.

5. In combination, an electrolytic detector cell, and a frequency selectable hydroacoustic band pass filter circuit device hydraulically connected to said cell, said device comprising a rotatable switch plate means having a plurality of dissimilar hydraulic conduits therein each adapted to be selectively connected to said detector cell upon rotation of said plate means for selectably changing the band pass characteristics of said filter circuit.

6. In combination, an electrolytic detector cell having an input, an hydraulic circuit means for receiving random hydroacoustic signals and hydraulically connected to said cell for transmitting received signals thereto, means for altering the band pass characteristic of said circuit including; a plurality of dissimilar hydraulic inductance-resistance elements disposed in said circuit and each adapted to be selectively connected to the input of said cell.

* * * * *